US005642306A

United States Patent [19]
Mennemeier et al.

[11] Patent Number: 5,642,306
[45] Date of Patent: Jun. 24, 1997

[54] METHOD AND APPARATUS FOR A SINGLE INSTRUCTION MULTIPLE DATA EARLY-OUT ZERO-SKIP MULTIPLIER

[75] Inventors: Larry M. Mennemeier, Boulder Creek; Wolf C. Witt, Walnut Creek, both of Calif.

[73] Assignee: Intel Corporation, Santa Clara, Calif.

[21] Appl. No.: 645,633

[22] Filed: May 15, 1996

Related U.S. Application Data

[63] Continuation of Ser. No. 281,571, Jul. 27, 1994, abandoned.

[51] Int. Cl.$^6$ .................................................. G06F 7/52
[52] U.S. Cl. ........................................... 364/757; 364/754
[58] Field of Search ....................................... 364/754, 757, 364/759, 760

[56] References Cited

U.S. PATENT DOCUMENTS

| | | | |
|---|---|---|---|
| 3,192,363 | 6/1965 | MacSorley | 364/760 |
| 3,711,692 | 1/1973 | Batcher | 364/715.09 |
| 3,723,715 | 3/1973 | Chen et al. | 364/715.09 |
| 3,900,723 | 8/1975 | Bethany et al. | 364/736 |
| 3,919,534 | 11/1975 | Hutson et al. | 235/156 |
| 4,161,784 | 7/1979 | Cushing et al. | 364/748 |
| 4,276,607 | 6/1981 | Wong | 364/757 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 395/800 |
| 4,989,168 | 1/1991 | Kuroda et al. | 364/715.09 |
| 5,021,987 | 6/1991 | Chan et al. | 364/254 |
| 5,095,457 | 3/1992 | Jeong | 364/758 |
| 5,187,679 | 2/1993 | Vassiliadis | 364/786 |

OTHER PUBLICATIONS

J. Shipnes, *Graphics Processing with the 88110 RISC Microprocessor*, IEEE (1992), pp. 169–174.
*MC88110 Second Generation RISC Microprocessor User's Manual*, Motorola Inc. (1991).
*Errata to MC88110 Second Generation RISC Microprocessor User's Manual*, Motorola Inc. (1992), pp. 1–11.
*MC88110 Programmer's Reference Guide*, Motorola Inc. (1992), p. 1–4.
*i860™ Microprocessor Family Programmer's Reference Manual*, Intel Corporation (1992), Ch. 1, 3, 8, 12.
R. B. Lee, *Accelerating Multimedia With Enhanced Microprocessors*, IEEE Micro (Apr. 1995), pp. 22–32.
*TMS320C2x User's Guide*, Texas Instruments (1993) pp. 3–2 through 3–11; 3–28 through 3–34; 4–1 through 4–22; 4–103; 4–119 through 4–120; 4–122; 4–150 through 4–151.
L. Gwennap, *New PA-RISC Processor Decodes MPEG Video*, Microprocessor Report (Jan. 1994), pp. 16, 17.
SPARC Technology Business, *UltraSPARC Multimedia Capabilities On–Chip Support for Real–Time Video and Advanced Graphics*, Sun Microsystems (Sep. 1994).

(List continued on next page.)

*Primary Examiner*—David H. Malzahn
*Attorney, Agent, or Firm*—Blakely, Sokoloff, Taylor & Zafman

[57] ABSTRACT

A method and apparatus for multiple parallel multiplications of multiple packed data using a single multiplier is provided. Given multiple packed data as multiplicand blocks and as multiplier blocks, an early-out zero-skip feature examines a multiplicand block to be multiplied to determine if the multiplicand block consists of all zeros. If the multiplicand block consists of all zeros, then the corresponding multiplication is skipped. The early-out zero skip multiplier also examines the most significant bits of a multiplier block to be multiplied to determine if the most significant bits consist of all zeros. If the most significant bits of the multiplier block to be multiplied consist of all zeros, then the multiplicand block is multiplied with only the least significant bits of the corresponding multiplier block. Otherwise, if the most significant bits of the multiplier block consist of both zeros and ones, then the corresponding multiplicand block is multiplied with the entire multiplier block.

13 Claims, 4 Drawing Sheets

OTHER PUBLICATIONS

Y. Kawakami et al., *LSI Applications: A Single–Chip Digital Signal Processor for Voiceband Applications*, Solid State Circuits Conference, Digest of Technical Papers; IEEE International (1980).

B. Case, *Phillips Hopes to Displace DSPs with VLIW*, Microprocessor Report (Dec. 94), pp. 12–18.

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual*, Intel Corporation (1993), Ch. 1, 3, 4, 6, 8, and 18.

METHOD AND APPARATUS FOR A SINGLE INSTRUCTION MULTIPLE DATA EARLY-OUT ZERO-SKIP MULTIPLIER

This is a Continuation Application of application Ser. No. 08/281,571, filed Jul. 27, 1994, now abandoned.

BACKGROUND OF THE INVENTION

(1) Field of the Invention

The present invention relates to the field of multipliers for performing binary multiplications. More particularly, the present invention relates to parallel multiple multiplications of packed data types.

(2) Art Background

Multipliers may be implemented by software or by hardware. As well known in the art, binary multiplication involves binary digits called bits [0, 1]. Multiplication performed on binary numbers by a single bit results in either zero or the original number. Intermediate partial products generated by multiplying a multiplicand by each bit of a multiplier are added to produce the overall product. One technique of multiplication often used in a software implemented multiplier is to sum the partial products one at a time as they are generated. A drawback to such an approach is that it takes at least one machine cycle to sum each additional partial product.

In contrast, direct hardware implementations of a multiplier can yield faster processing of a multiplication operation. Even faster processing may be obtained through skipping execution cycles where an operand is composed of all zeros. Still even faster processing may be obtained by skipping the multiplications for leading bits of an operand which are all zeros and have not yet been processed.

In performing multiple multiplications in parallel, more than one multiplier is necessary. However, multipliers are very large and expensive to build. It is desirable to provide a method and apparatus for performing binary multiplication which requires relatively few multipliers and which incorporate the aforementioned feature for skipping certain multiplications or steps in multiplications which will result in pre-determined results. Such a method and apparatus are especially needed for parallel multiplications being performed on multiple packed data types which may otherwise require the use of numerous multipliers.

BRIEF SUMMARY OF THE INVENTION

The present invention provides a method and apparatus for multiple parallel multiplications of multiple packed data using a single multiplier. Independent packed data multiplicand blocks and corresponding multiplier blocks in a multiple parallel multiplication of multiple packed data are pipelined through a single multiplier.

Given multiple packed data as multiplicand blocks and as multiplier blocks, a multiplier of the present invention with an early-out zero-skip feature examines a multiplicand block to be multiplied to check if the multiplicand block consists of all zeros. If the multiplicand block consists of all zeros, then the corresponding multiplication is skipped. The early-out zero skip multiplier also examines the most significant bits of a multiplier block to be multiplied to check if the most significant bits consists of all zeros. If the most significant bits of the multiplier block to be multiplied consist of all zeros, then the multiplicand block is multiplied with only the least significant bits of the corresponding multiplier block. Otherwise, if the most significant bits of the multiplier block consist of both zeros and ones, then the corresponding multiplicand block is multiplied with the entire multiplier block.

For example, given two sets of four sixteen-bit blocks of packed data, each in a sixty-four bit word, as operands for the multiplication, instead of requiring multiple multipliers to execute the four multiplications in parallel, all that is needed with the invention is a single multiplier. Furthermore, an early-out zero skip feature provides increased efficiency in speed in the execution of the multiple parallel multiplications.

DETAILED DESCRIPTION OF THE INVENTION

An apparatus and method for a single instruction multiple data early-out zero-skip multiplier for performing multiplications on independent data stored as packed vectors in registers is disclosed in the following description.

Figure 1:
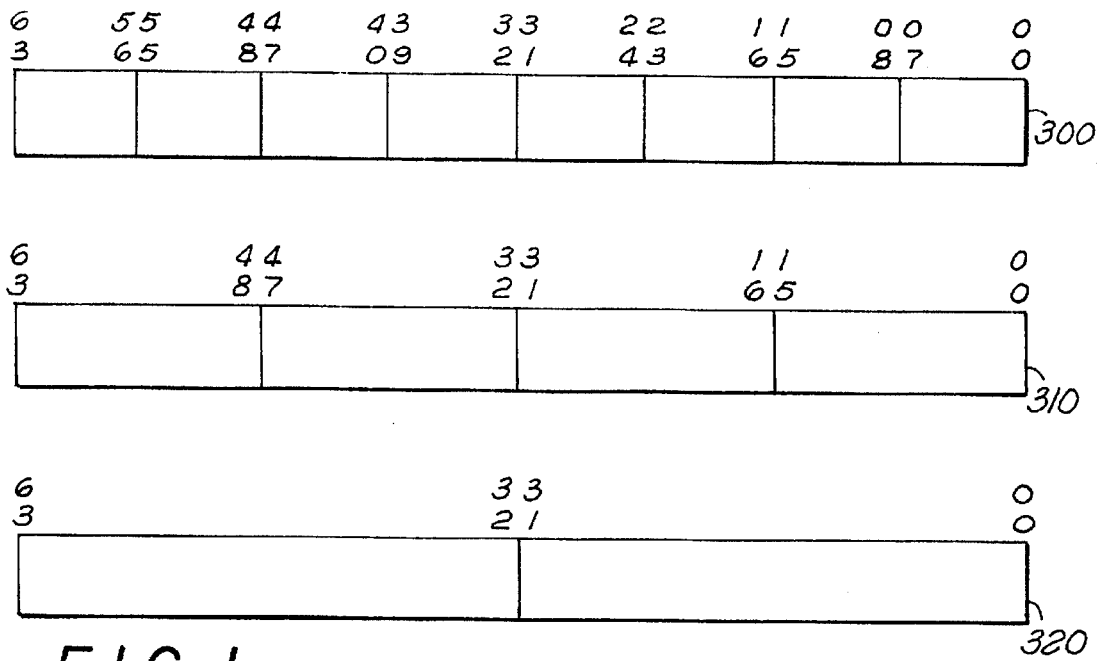
FIG. 1 illustrates sixty-four-bit registers with three different types of packed data types used as operands for the multiplication method and apparatus of the present invention.
Figure 4:
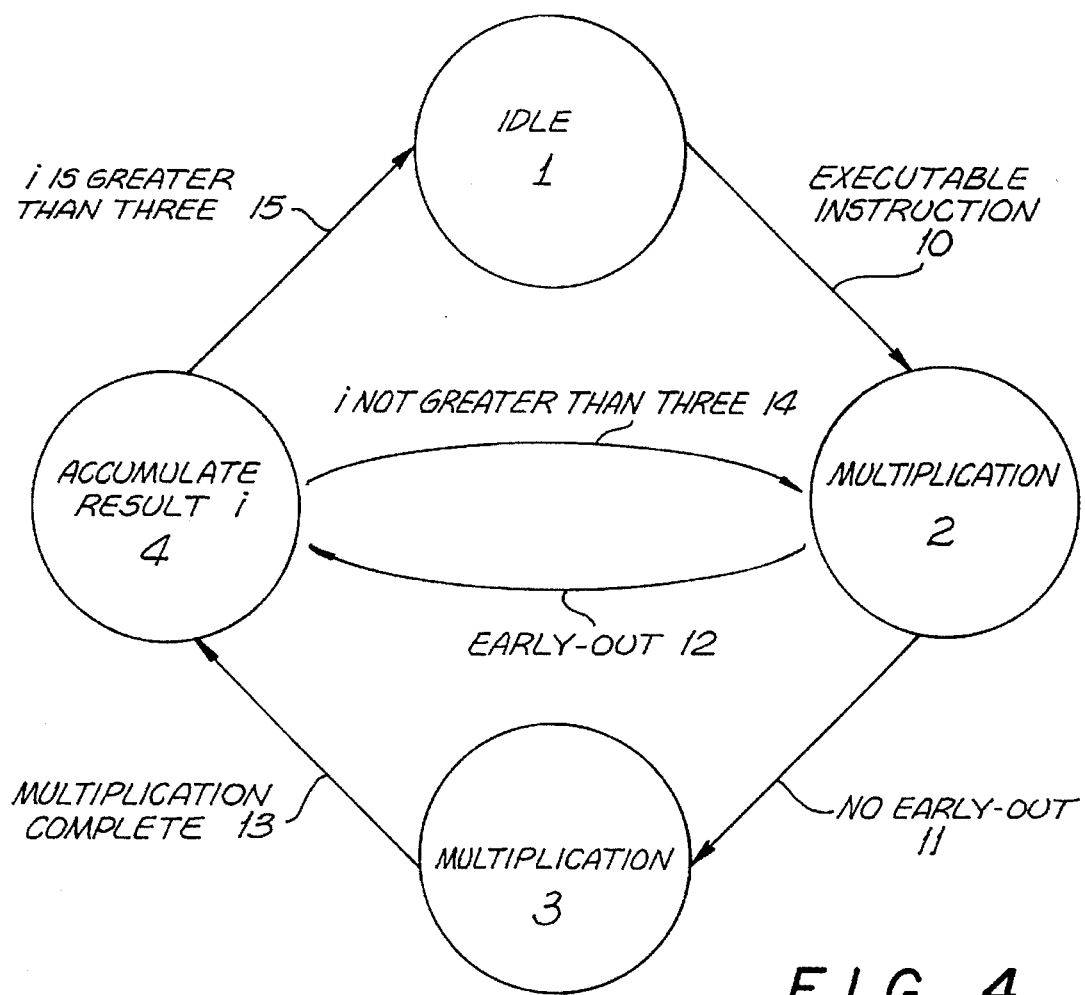
FIG. 4 is a state diagram illustrating the functions of a single instruction multiple data early-out zero-skip multiplier during four packed sixteen-bit multiplications.

FIG. 1 illustrates three different types of data representations of sixty-four-bit independent data stored as packed data types in sixty-four bit words. Representation 300 illustrates eight packed consecutive bytes. Representation 310 illustrates four packed sixteen-bit words. Representation 320 illustrates two packed double words (each thirty-two bits). Bit zero is the least significant bit and the highest number bit is the most significant bit. The early-out zero-skip multiplier performs multiplication operations using operands of these packed data types. The early-out zero-skip mechanisms of the multiplier are utilized to enable multiplication operations to be performed faster. The process by which the early-out and the zero-skip mechanisms are implemented is described in more detail in the following description and is illustrated in FIGS. 2 through 4.

Figure 2:
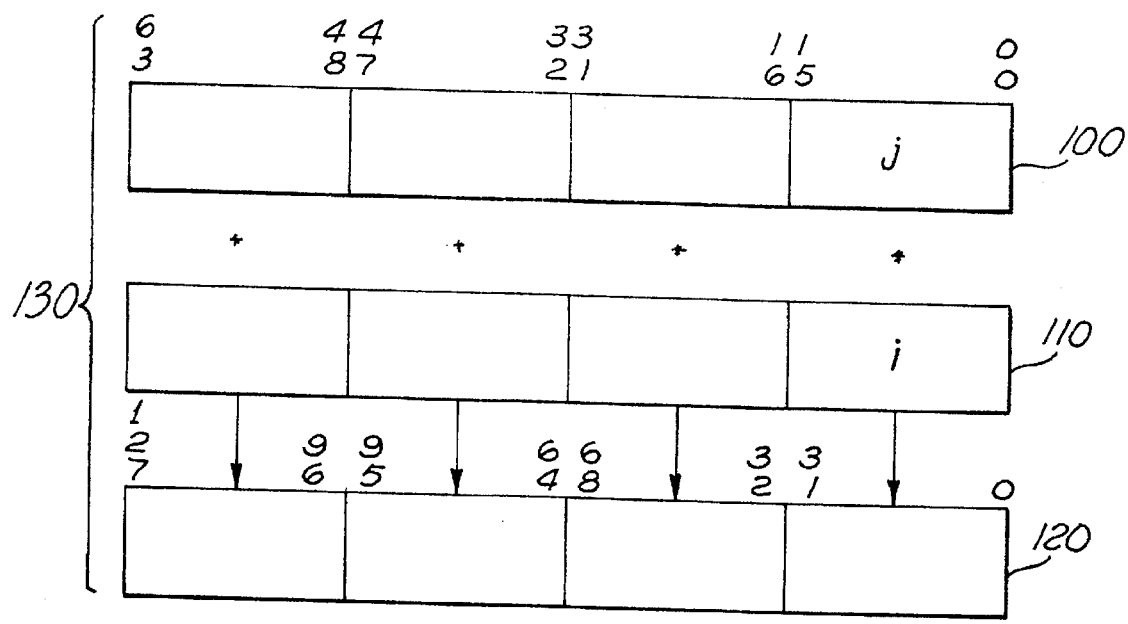
FIG. 2 shows two pictures, both illustrating the same four packed sixteen-bit multiplications.
Figure 2:
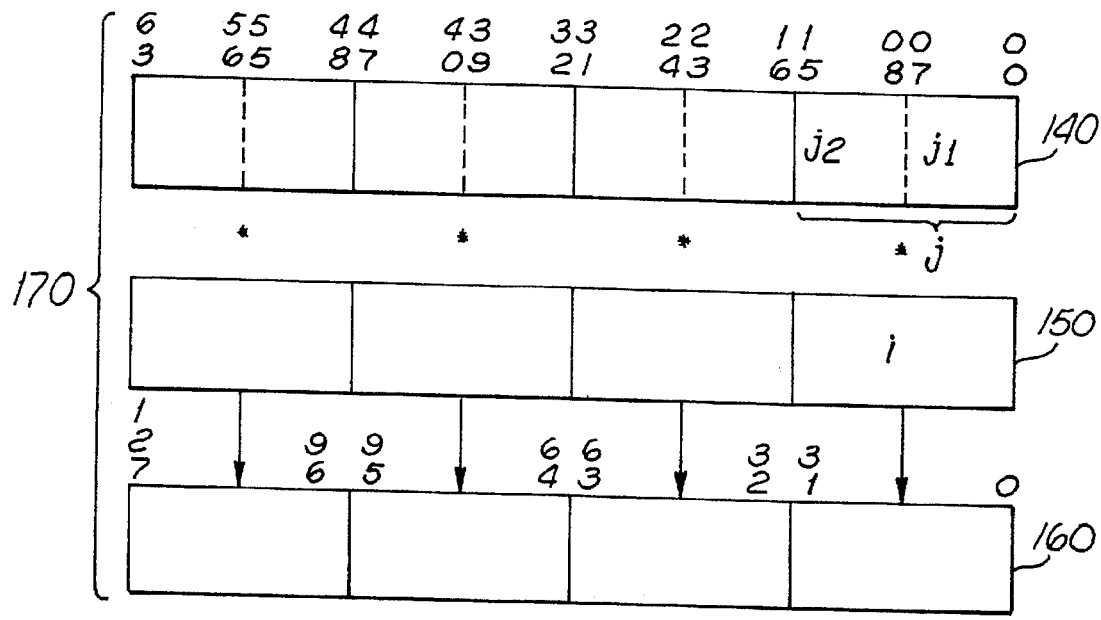
Figure 3:
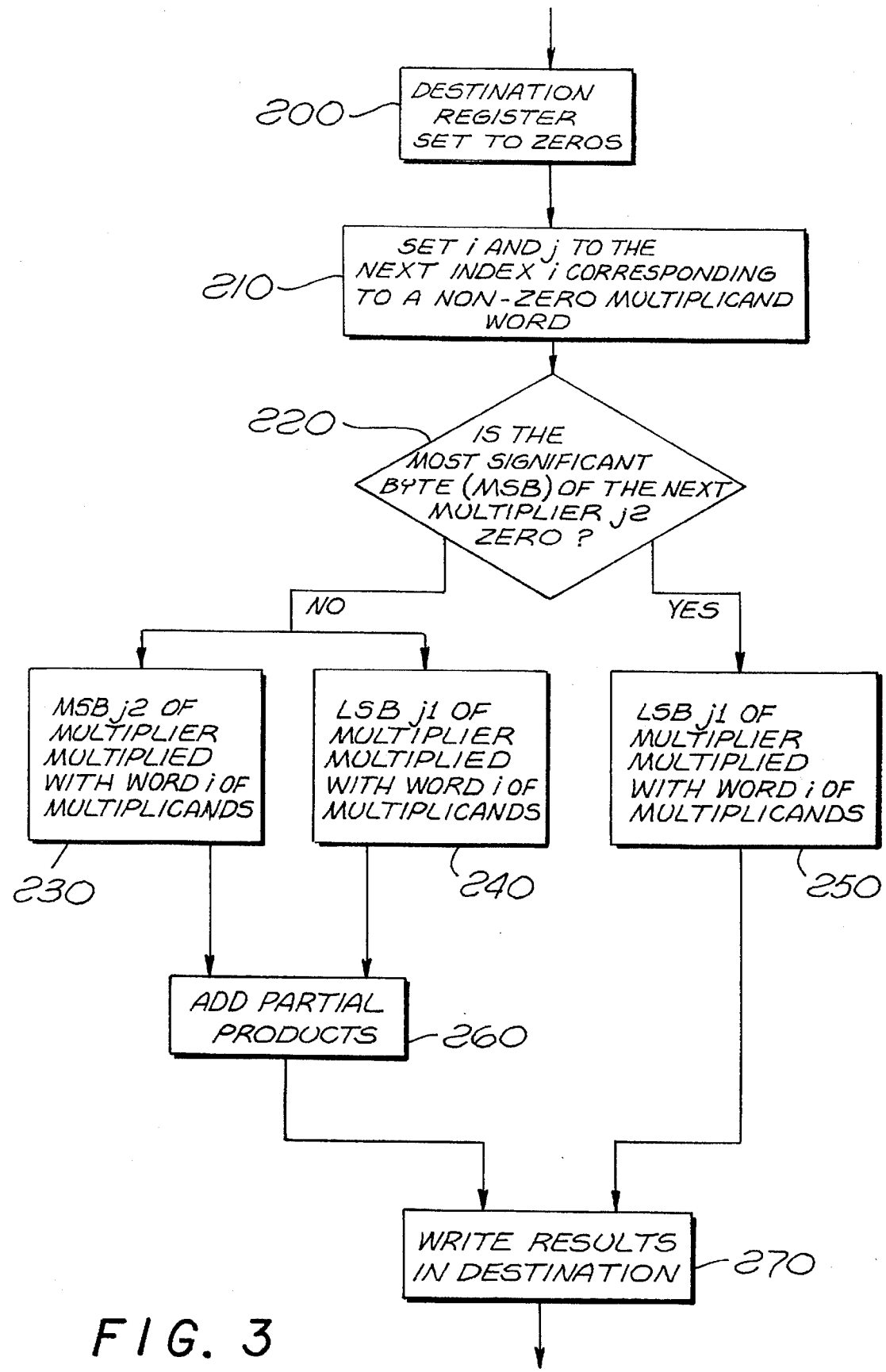
FIG. 3 is a general flow chart showing the early-out zero-skip method of the present invention.

FIG. 2 illustrates the operands of a parallel multiplication of two vectors each containing four packed sixteen-bit independent data. Multiplication sequence 130 is represented by multiplier operand block 100, multiplicand operand block 110 and destination block 120. Block 100 is a sixty-four-bit register containing a vector of four sixteen-bit packed data. Each sixteen-bit datum in block 100 is an independent element of the vector and is indicated by j and is a multiplier operand in the represented multiplication. Block 110 is also a sixty-four-bit register containing a vector of four sixteen-bit packed data where each of the four sixteen-bit packed data is an independent element of the vector and is indicated by an i and is a multiplicand operand of the multiplication. Finally, block 120 is a one-hundred-twenty-eight-bit register where the four results of the multiplications are stored.

Multiplication sequence 170 illustrates the same sequence as sequence 130 but using an eight by sixteen multiplier. As shown in multiplier operand block 140, each of the sixteen-bit packed vector elements is split into two eight-bit bytes of data wherein the least significant byte is denoted by $j_1$ and the most significant byte is denoted by $j_2$. Multiplicand operand block 150 is analogous to multiplicand operand block 110 in multiplication sequence 130 and destination block 160 is analogous to destination block 120 of multiplication sequence 130.

Given two operands, one a multiplier operand and the other a multiplicand operand in a multiplication, depending on the bit pattern of the operands, all blocks of the operands may not need to be processed during multiplication. The early-out mechanism and the zero-skip mechanism take advantage of this fact allowing for some of the execution cycles to be omitted. The early-out mechanism of the present invention examines the bit pattern in the multiplier operand and if in any given cycle all significant non zero bits have already been processed, the multiplication sequence for that particular block is stopped early. For example, referring to multiplication sequence 170 of FIG. 2 during the first cycle of a 16-bit by 16-bit, multiplication where multiplier operand block j is multiplied with multiplicand operand block i, the early-out mechanism examines bits 8 through 15 of the multiplier operand (illustrated as byte $j_2$ in FIG. 2).

Given an unsigned multiplication, if all of the bits remaining to be processed in a block (bits 8 through 15) are zeros, then the multiplication for block j for the multiplier operand and block i for the multiplicand operand is completed once the least significant byte $j_1$ has been multiplied with multiplicand i. If the multiplier uses Modified Booth Encoding which as is well known in the art to encode a group of ones as a zero, and makes use of the signed/unsigned adjustment term described below the unsigned multiplication may be terminated if all the bits in the blocks examined are ones.

For a signed multiplication, the early-out mechanism examines bits 8 through 15 (most significant byte $j_2$) and if all these bits are the same, i.e., if they are all zeros or all ones, depending on the sign of the operand, then the multiplication operation is completed by multiplying multiplier operand block $j_1$ with a multiplicand operand block i. A signed/unsigned adjustment term is introduced directly into the second stage of the multiplier device during the first cycle of the multiplication. Hence, if an unsigned multiplication is terminated early due to the detection of leading ones in the multiplier, the operation still yields the correct result.

The zero-skip mechanism examines a block to be multiplied in a multiplicand operand to determine whether or not the block consists of all zeros. If a block of the multiplicand operand i consists of all zeros then the multiplication operation for that multiplicand operand i is skipped and the zero-skip mechanism continues with the next block to be multiplied to determine whether or not the next block contains all zeros. Hence, all the multiplicand operand blocks containing all zeros are skipped and the corresponding execution cycles are omitted.

FIG. 3 is a general flow chart showing the early-out zero-skip mechanism. In box 200, the destination register where the results of the multiplications are stored is set to zeros. In a four parallel sixteen-bit packed vector multiplication, all four blocks within a one-hundred-twenty-eight-bit destination register are set to zeros. Box 210 illustrates the zero-skip method step. In box 210, multiplicand operand block i is set to the next index i corresponding to a non-zero word. Multiplying a block of a multiplicand operand comprised of all zeros with any number results in zeros. Thus, to expedite the multiplication, all blocks in a destination register are set to zeros as indicated in box 200 and any multiplication which has a block i multiplicand operand which is all zeros, is skipped. Since the destination for each block in a destination register is already zero, skipping such multiplication where a multiplicand operand i is a zero speeds up the multiplication and still yields the correct multiplication results for the skipped multiplication.

Boxes between 220 and 250 illustrate the early-out mechanism. In box 220, the most significant byte of the multiplier operand is checked for whether or not it consists of all zeros. In box 250, if the most significant byte $j_2$ of the next multiplier operand j consists of all zeros, then the multiplier device only multiplies the least significant byte $j_1$ with the multiplicand operand i and writes the result into the corresponding block in the destination register. In boxes 230 and 240, if the most significant byte of the next word j of the multiplier operand does not consist of all zeros then the multiplier operand is multiplied with the corresponding multiplicand operand block i. If the multiplication process uses an eight-bit by sixteen-bit multiplier, then block $j_1$ of one of the multiplier operand registers is multiplied with block i of the multiplicand operand register and block $j_2$ of the same multiplier operand register is multiplied to block i of the multiplicand operand register. In box 260, the partial products of the two multiplications are added together. Finally, in box 270, the sum of the partial products is then written into the corresponding block of the destination register. The aforementioned process is repeated until all four of the packed sixteen-bit multiplications are completed.

FIG. 4 is a state diagram of the functions of a single instruction multiple data early-out zero-skip multiplier during four packed sixteen-bit multiplications using a single eight-bit by sixteen-bit multiplier. In idle state 1, the multiplier device remains idle until an instruction it can execute is issued. Once such an instruction is issued, the multiplier and multiplicand operand registers are enabled. All the blocks in a destination register are set to zeros. Indices i and j for the multiplicand operand block and the multiplier operand block, respectively, are set to zero. Thus, multiplicand operand block zero (i.e., i=0) of the multiplicand operand register is used as the first multiplicand in the first execute cycle of the multiplication.

The state is transferred from idle state 1 to multiplication state 2 after an executable instruction 10 is issued. Multiplication state 2 is the first execute cycle of the multiplication. Block i of the multiplicand operand is multiplied with byte $j_1$ of the multiplier operand in the first stage of the data path. If byte $j_2$ of the multiplier operand consists of all zeroes and hence an early-out has been detected (state transition 12), the state transfers to the final accumulate step state 4 and multiplication state 2 represents the only multiplication cycle for this multiplication.

If an early-out has not been detected (state transition 11), then the state transfers to multiplication state 3 from multiplication state 2 and block i of the multiplicand operand is multiplied with multiplier operand byte $j_2$. After such operation, the state is transferred from multiplication state 3 to the final accumulate step state 4.

Thus, in the first stage of the data path, block i of the multiplicand operand is multiplied with byte $j_2$ of the multiplier operand. In addition the partial result generated during the previous cycle is accumulated in the second stage of the data path. Upon completion of state 3, the multiplication is complete (state transition 13) and only the final accumulate step in state 4 remains.

In the final accumulate state 4, the final state for a multiplication, the final result is formulated by taking the partial result that was generated in the previous state which is accumulated in the second stage of the data path. A destination register is enabled and the result is stored in the destination register. At this point the i register for the multiplicand operand and the j register for the multiplier operand are set to the next none-zero word i and if i is not greater than three (state transition 14), i.e., if all four multiplications have not been completed, then the state is returned to multiplication state 2.

Finally, when the multiplication for all four blocks of the multiplicand operand is completed (transition 15), the state returns to idle state 1 and the multiplier device again returns to an idle state until the next new instruction to be executed is issued.

Figure 5:
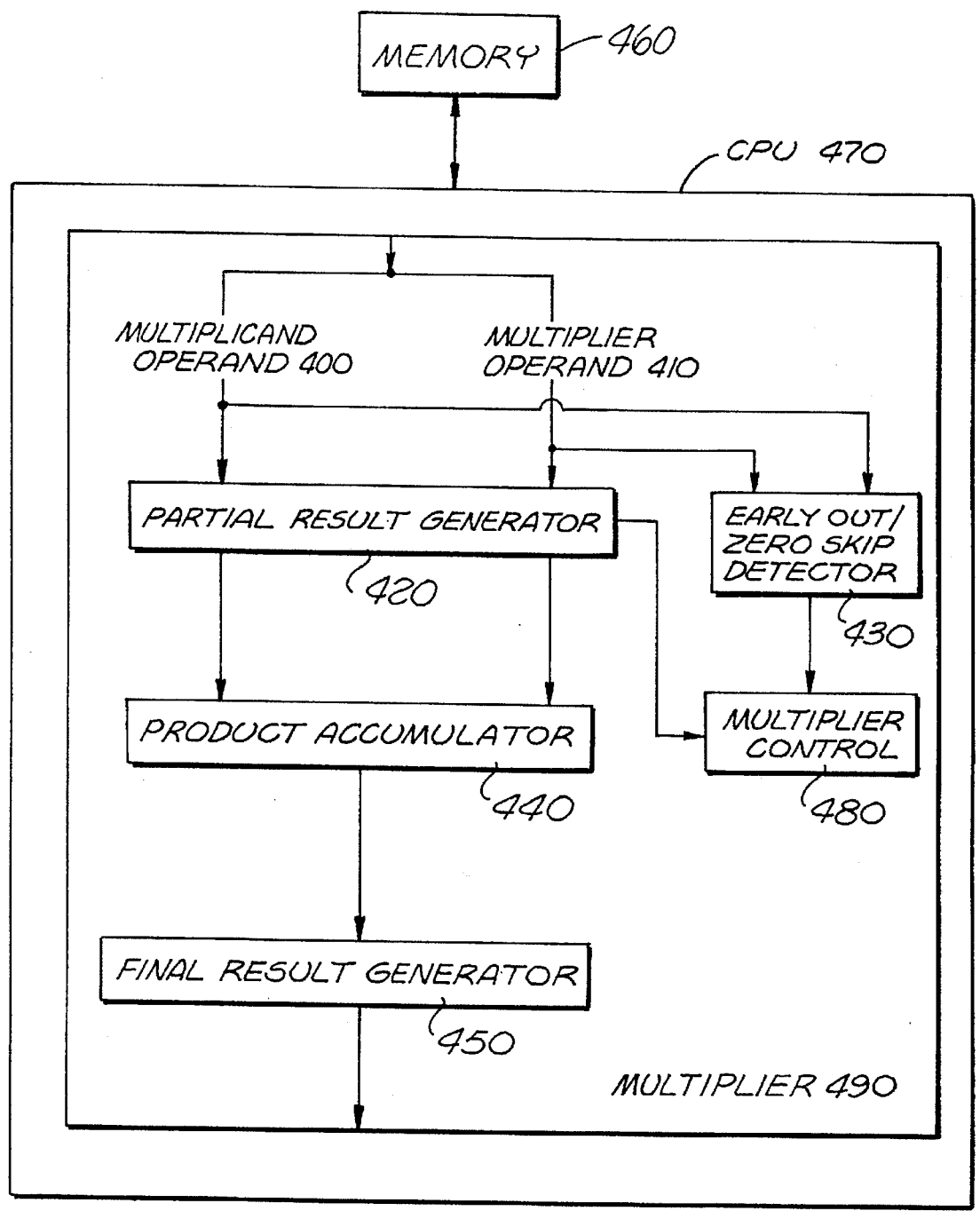
FIG. 5 is a block diagram of a multiplier data path of the present invention.

FIG. 5 is a block diagram of a multiplier data path of the present invention. Upon an issuance of an instruction that the multiplier device 490 of CPU 470 can execute, multiplicand operand 400 and multiplier operand 410 provided by operand registers in memory 460 are examined for the early-out and zero-skip conditions by early-out zero-skip detector 430.

If early-out and/or zero-skip condition is detected, such information is input into multiplier control block 480, which then provides control signals to enable the early-out/zero-skip mechanisms. Accordingly, if an early-out is detected, any partial results that would not contribute to the overall result are skipped. If a zero-skip is detected, the multiplicand block within multiplicand operand 400 containing all zeros is skipped. Partial result generator 420 then generates a partial result. The partial result is then fed into product accumulator 440 which accumulates (i.e., adds together) the partial results generated by partial result generator 420 to form the final product of the multiplication. This final product of the multiplication is then input into final result generator 450. The final result generator 450 then writes the final result of the multiplication into a destination register in memory 460. Alternatively, an eight-bit by eight-bit multiplier, an eight-bit by sixteen-bit multiplier, a sixteen by sixteen multiplier, etc., may be used as the single multiplier depicted by multiplier 490 in FIG. 5.

Memory 460 may be a high speed cache memory and/or a general purpose register file. Further, CPU 490 may comprise of a microcoded or hardwired engine for converting macro instructions into microcode sequences and/or control signals.

Given an embodiment of the invention where a sixty-four-bit vector multiplicand operand register is being multiplied with a sixty-four-bit vector multiplier operand register where each operand register contains four sixteen-bit element blocks, the blocks may be separated and the respective multiplications may be executed by pipelining the respective multiplicand operand block and the multiplier operand block through multiplier 490.

The present invention is valuable in performing coding techniques that are used for standards in video conferencing and digital movies. Only eight bits of information are typically required to represent a pixel's color component in images used in video conferencing and movies. Sixteen-bit arithmetic operations can typically be used to perform operations such as Discrete Cosine Transforms (DCT) which transform the values underlying the pixels from an intensity domain to a frequency domain. Pictures consist mostly of low frequency components which permits many high-frequency components to be represented by zeros. An inverse DCT involving multiplication, addition and subtraction operations on underlying values which are mostly zeros may take advantage of the present invention to save computation cycles and to yield higher temporal and spacial resolutions.

Given the aforementioned particular characteristics of motion video techniques such as the eight-bit representation of a pixel and the eight-bit by eight-bit pixel block operations in an image space, use of a single multiplier with the early-out zero-skip mechanism is an advantage when applied to motion video algorithms. The aforementioned Discrete Cosine Transform (DCT), which is particular to images and is used for compressing images, typically outputs many zeros out of an eight-bit by eight-bit block operation. The multiplier of the present invention allows for fast multiplication operations to be performed on values containing many zeros in the eight-bit by eight-bit block operations involved in standard coding techniques in motion picture videos.

For purposes of explanation, specific data types, etc., are set forth to provide a thorough understanding of the present invention. It will be appreciated that the above-described invention may be embodied in other specific forms without departing from the spirit or essential characteristics thereof. The present embodiments are, therefore, to be considered in all aspects as illustrative and not restrictive on the broad invention, in that this invention not be limited to the specific arrangements and constructions shown and described.

What is claimed is:

1. A single instruction method of multiple parallel multiplications of multiple packed data using a single multiplier, comprising the following steps:

receiving multiple packed data for multiplications;

pipelining the multiple multiplications of the multiple packed data through the single multiplier, each said multiple packed data stored sequentially from each other such that said multiple packed data are multiplied in parallel using said single multiplier, the multiple packed data comprising current multiplicand and current multiplier blocks;

skipping multiplication of most significant bits of said current multiplier block if most significant bits are all zeros, said current multiplier block and said current multiplicand block consisting of said multiple packed data; and skipping multiplication of said current multiplicand block with all zeros.

2. An apparatus for parallel multiplications of multiple packed data, said apparatus comprising:

a single multiplier multiplying multiple packed data, each said multiple packed data stored sequentially from each other such that said multiple packed data are multiplied in parallel using said single multiplier, said single multiplier having an early-out zero-skip detector for detecting and skipping multiplication for multiplicand blocks with all zeros and detecting multiplier blocks with all zeros for most significant bits and skipping multiplication of said most significant bits if said most significant bits are zeros; and a storage element coupled to said single multiplier for storing the packed data.

3. The apparatus of claim 2 wherein said single multiplier comprises:

a partial result generator for generating partial results obtained from multiplying a current multiplicand with a current multiplier;

a product accumulator coupled to said partial result generator for adding said partial results; and a result generator coupled to said product accumulator for driving a final result into a destination register.

4. An apparatus for parallel multiplications of multiple packed data, said apparatus comprising:

means for multiplying multiple packed data each said multiple packed data stored sequentially from each other such that said multiple packed data are multiplied in parallel, and generating a result comprising, means for skipping multiplication of most significant bits of a current multiplier block if most significant bits are all zeros, said current multiplier block and said current multiplicand block consisting of said packed data, and means for skipping multiplication of said current multiplicand block with all zeros, said means for skipping coupled to said means for skipping multiplication of most significant bits;

means for storing the packed data coupled to said means for multiplying.

5. The apparatus of claim 4 wherein said means for multiplying further comprises:

means for generating partial results obtained from multiplying a current multiplicand block with a current multiplier block; and means for accumulating said partial results coupled to said means for generating partial results.

6. The apparatus of claim 4 further comprising:

means for detecting said current multiplicand block with all zeros coupled to said means for skipping multiplication of most significant bits, said means for skipping multiplication of most significant bits skips said most significant bits of said current multiplicand block when said means for detecting determines that said current multiplicand block contains all zeros;

means for multiplying only least significant bits of said current multiplier block with corresponding bits of said current multiplicand block if said most significant bits of said current multiplier block consist of all zeros, said means for multiplying only least significant bits coupled to said means for detecting; and means for multiplying said current multiplier block with said current multiplicand block if said most significant bits of said current multiplier block consist of both zeros and ones, said means for multiplying said current multiplier block coupled to said means for multiplying only least significant bits.

7. The apparatus of claim 4 wherein said means for skipping multiplication for said current multiplicand further comprises means for skipping to a next multiplicand block to be multiplied if said current multiplicand block consists of all zeros.

8. A system for parallel multiplication of multiple packed data, said system comprising:

a single multiplier parallel multiplying multiple packed data each said multiple packed data stored sequentially from each other such that said multiple packed data are multiplied in parallel using said single multiplier, comprising, an early-out zero-skip detector for detecting and skipping multiplication for current multiplicand block with all zeros and detecting current multiplier block with all zeros for most significant bits and skipping multiplication of said most significant bits if said most significant bits are zeros;

a storage element for storing the packed data; and a CPU coupled to said storage element, said CPU issuing instructions executable by the multiplier.

9. The system of claim 8 wherein said single multiplier further comprises:

a partial result generator for generating partial results obtained from multiplying a current multiplicand block with a current multiplier block;

a product accumulator coupled to said partial result generator for adding said partial results; and a result generator coupled to said product accumulator and driving a final result into a destination register.

10. The system of claim 8 wherein said storage element further comprises a high speed cache memory.

11. The system of claim 8 wherein said storage element further comprises a general purpose register file.

12. The system of claim 8 wherein said CPU further comprises a microcoded engine for converting macro instructions into microcode sequences and control signals.

13. The system of claim 8 wherein said CPU further comprises a hardwired engine for converting macro instructions into microcode sequences and control signals.

* * * * *